(12) United States Patent
Narang et al.

(10) Patent No.: US 8,990,209 B2
(45) Date of Patent: Mar. 24, 2015

(54) DISTRIBUTED SCALABLE CLUSTERING AND COMMUNITY DETECTION

(75) Inventors: Ankur Narang, New Delhi (IN); Jyothish Soman, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 13/604,910

(22) Filed: Sep. 6, 2012

(65) Prior Publication Data

US 2014/0067808 A1    Mar. 6, 2014

(51) Int. Cl.
 *G06F 17/30* (2006.01)
 *G06Q 10/04* (2012.01)

(52) U.S. Cl.
 CPC .................................. *G06Q 10/04* (2013.01)
 USPC ........................................ 707/737; 707/736

(58) Field of Classification Search
 USPC .................................................. 707/736, 737
 See application file for complete search history.

(56) References Cited

U.S. PATENT DOCUMENTS

| | | | | |
|---|---|---|---|---|
| 7,627,542 | B2* | 12/2009 | Tantrum et al. | 706/20 |
| 8,533,236 | B1* | 9/2013 | Baluja et al. | 707/802 |
| 2005/0038533 | A1* | 2/2005 | Farrell et al. | 700/73 |
| 2007/0203924 | A1* | 8/2007 | Guha et al. | 707/100 |
| 2008/0247646 | A1* | 10/2008 | Chefd'hotel et al. | 382/173 |
| 2010/0041411 | A1 | 2/2010 | Mallik et al. | |
| 2010/0185935 | A1 | 7/2010 | Yang et al. | |
| 2011/0103711 | A1* | 5/2011 | Su et al. | 382/276 |
| 2011/0145238 | A1 | 6/2011 | Stork | |
| 2011/0320387 | A1* | 12/2011 | He et al. | 706/12 |
| 2012/0016756 | A1* | 1/2012 | Nguyen et al. | 705/16 |
| 2012/0027300 | A1* | 2/2012 | Zhou et al. | 382/173 |

FOREIGN PATENT DOCUMENTS

WO    2012004425 A1    1/2012

OTHER PUBLICATIONS

Younis et al., "Heed: A Hybrid, Energy-Efficient, Distributed Clustering Approach for Ad Hoc Sensor Networks", Oct.-Dec. 2004, IEEE, pp. 366-379.*
Crick et al., "Loopy Belief Propagation as a Basis for Communication in Sensor Networks", 2003, pp. 159-166.*
Lancichinetti et al., Detecting the Overlapping and Hierarchical Community Structure in Complex Networks. New Journal of Physics, vol. 11, Mar. 2009.
Fortunato, Community Detection in Graphs, Complex Networks and Systems Language Laboratory, ISI Foundation, Nov. 2009.
Masdarolomoor, Distributed Community Detection in Complex Networks, Computational Intelligence, Communication Systems and Networks, Third International Conference, Jul. 2011.

(Continued)

*Primary Examiner* — Apu Mofiz
*Assistant Examiner* — Jared Bibbee
(74) *Attorney, Agent, or Firm* — Ryan, Mason & Lewis, LLP (57) ABSTRACT

Techniques, an apparatus and an article of manufacture for distributed scalable clustering and community detection. A method includes generating a label for each node in a graph, wherein said label identifies a community in which a node participates, propagating each label locally within two or more segments of the graph based on a participation percentage of each node in at least one identified community within the graph, and deriving at least one cluster of nodes in the graph that corresponds to the at least one identified community based on said propagating.

20 Claims, 3 Drawing Sheets

(56) References Cited

OTHER PUBLICATIONS

Traag et al., Community Detection in Networks with Positive and Negative Links, Phys. Rev. E 80, 036115, 2009.
Zhang et al., Parallel Community Detection on Large Networks with Propinquity Dynamics, in Proceedings of the 15th ACM SIGKDD International Conference on Knowledge Discovery and Data Mining, 2009, ACM, pp. 997-1006.
Newman, The Spread of Epidemic Disease on Networks, Physical Review E 66, 1 2002, 16128.
Newman, Finding Community Structure in Networks Using the Eigenvectors of Matrices, Physical Review E 74, 3 (2006), 36104.
Newman et al., Finding and Evaluating Community Structure in Networks, Physical Review E 69, 2 (2004), 26113.
Newman, Fast Algorithm for Detecting Community Structure in Networks, Phys. Rev. E 69, 6 (Jun. 2004), 066133.
Tibely et al., On the Equivalence of the Label Propagation Method of Community Detection and a Potts Model Approach, Physica A: Statistical Mechanics and its Applications 387, 19-20 (2008), 4982-4984.
Leung et al., Towards Real-Time Community Detection in Large Networks, Physical Review E 79, 6 (Jun. 2009).

\* cited by examiner

DISTRIBUTED SCALABLE CLUSTERING AND COMMUNITY DETECTION

FIELD OF THE INVENTION

Embodiments of the invention generally relate to information technology, and, more particularly, to community detection in graphs.

BACKGROUND

Graph Clustering and community detection on distributed architectures and/or multi-core clusters using large amounts of data (for example, petabytes or more) presents challenges. Existing algorithmic frameworks, disadvantageously, include large time complexity and/or are not scalable on large multi-core clusters. Consequently, a need exists for techniques and/or frameworks to address these issues.

SUMMARY

In one aspect of the present invention, techniques for distributed scalable clustering and community detection are provided. An exemplary computer-implemented method for deriving a cluster of nodes in a graph that correspond to an identified community can include steps of generating a label for each node in a graph, wherein said label identifies a community in which a node participates, propagating each label locally within two or more segments of the graph based on a participation percentage of each node in at least one identified community within the graph, and deriving at least one cluster of nodes in the graph that corresponds to the at least one identified community based on said propagating.

In another aspect of the invention, an exemplary computer-implemented method for using label propagation to derive overlapped communities in multiple graphs can include steps of generating a label for each node in each of two or more graphs, wherein said label identifies a community in which a node participates, propagating each label locally within multiple segments of the two or more graphs based on a participation percentage of each node in multiple identified communities within the two or more graphs, deriving clusters of nodes in the graph that correspond to a set of non-overlapping communities amongst the multiple identified communities based on said propagating, and using a participation percentage for each node in the set of non-overlapping communities to derive at least one overlapping community in the two or more graphs.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes a distributed scalable clustering and community detection framework. At least one embodiment of the invention includes using distributed asynchronous label propagation to provide overlapped and hierarchical clusters on multiple types of graphs, including directed/undirected, signed/unsigned and weighted/un-weighted. As used herein, asynchronous label propagation refers to a technique for label propagation wherein between two rounds of label propagation across the complete graph, there is no need for a wait stage for one round to finish and another round to start. Additionally, hierarchical clusters refer to the tendency of clusters to be nested, forming a hierarchy of clusters. Such features make the techniques and frameworks detailed herein applicable to a variety of graphs as well as enable operation in a distributed fashion over large amounts of data. Accordingly, at least one embodiment of the invention provides a framework that is scalable to large networks (for example, networks having as many as billions of vertices and nodes) and extendible to multiple architectures including multi-core cluster, map-reduce, etc.

Applications of an embodiment of the invention can include, for example, document summarization, web indexing, co-clustering, localized recommendation systems for friend circles to find dominant trends, etc.

As described herein, at least one embodiment of the invention includes relying on a flat decomposition which finds groups and/or communities as a post-processing step rather than as a primary process. Such techniques are also bottom-up processes. At least one embodiment of the invention also includes generating k-levels of hierarchy, which is adaptive with respect to the structure of an input graph.

By way of example, given a graph, an aspect of the invention includes dividing the graph into smaller groups so that each group member has improved affinity with respect to other members of the same group. Each group can be, for example, internally dense and have a limited number of inter-group edges. By way of example, consider the following:

Given any set of graph partitions $S=\{G_1, G_2, G_3, \ldots G_k\}$: $G=\{G_1 \cup G_2 \cup G_3 \cup \ldots G_k\}$, and a quality function Q, an aspect of the invention can include defining the optimal partition of the network as $P=\mathrm{argmax}(Q_{S' \in S}(S'))$. P represents maximizing the quality function, while the number of groups, k, is originally unknown and learnt from data. The quality function used can include, for example, a modularity function.

In accordance with at least one embodiment of the invention, a label propagation framework for community detection can include the following. For each node, a unique label is initialized. Also, the graph in question is pre-processed to remove topological anomalies and enhance community structure. In each iteration of the label propagation algorithm, labels are propagated locally, where each decision is locally made. In at least one embodiment of the invention, a label propagation framework is fully parallel in nature, producing a technique where no section of the algorithm needs to be performed sequentially, hence escaping sequential bottlenecks. Synchronization after each iteration, in general, includes a bottleneck, and any such synchronization is also absent from one or more embodiments of the invention.

A community detection framework in accordance with at least one embodiment of the invention can be applicable to various types of graphs such as signed or unsigned networks, directed or undirected networks, and/or weighted or un-weighted networks. Additionally, any combination of these three sets forms a class of graphs, and community detection functions differently for each class. As also described herein, at least one embodiment of the invention includes considerations for overlapping communities and hierarchical communities.

Accordingly, an asynchronous local propagation algorithm can include the following. For propagation functions of the form $L_i(v)=f(L_{i-1}(N(v)))$, each propagation step has local dependency on an iteration number, and each node asks for current values from neighbors to generate data for the next iteration. Here, $L_i(v)$ refers to the label of vertex v in the iteration i, $N(v)$ is the neighborhood of v, and f is a quality function. Further, iteration dependency is local in nature, with each node, when at iteration i, can operate on its neighborhood data if all neighbors have data for iteration i−1. The total number of iterations that can run in parallel is dependent on the diameter D of the graph. Here, D represents the longest path in the graph. Further, each node can vary from its neighbor by a maximum of one iteration, hence the relation.

Additionally, in at least one embodiment of the invention, explicit global synchronization is not required, and synchronization can implicitly be carried out. At any given point of time, up to D iterations can run in parallel, and communication overload can be reduced, for example, via use of a push data model.

As noted herein, at least one embodiment of the invention includes overlapping and/or hierarchical community detection. In an example embodiment, matrix P is the participation matrix, which represents percentage of participation of each vertex to each community. Additionally, the number of communities is initialized to the number of nodes. Initializing each node as an independent community attains this value.

Further, an example embodiment of the invention includes iterative optimization of the participation matrix as follows: $P'=P \times W_n \times W_e$, wherein $W_n$ is the weight of a community represented by a node, and wherein $W_n'=\text{Norm}(P') \times W_e$. Additionally, $W_e$ is the weight of an edge, and P' is an intermediate value, such that $P=\text{Norm}(P')$. At least one embodiment of the invention includes iterating until the difference across iterations is below a pre-specified threshold.

An algorithm for overlapping and hierarchical community detection can include the following. As noted, a resulting matrix P represents the participation percentage in each community for a given node, and for each node, a participation vector is sorted based on participation percentage. A leading community represents the primary community of a node, to which the node has the maximum participation percentage. Each such community, which is a leading community for at least one node, can be considered as a primary community. A primary community includes nodes that have the given primary community as its leading community. Additionally, a set of primary communities represents non-overlapping communities, and the percentage of participation in the primary communities for each node can generate overlapping communities for the entire graph.

In accordance with at least one embodiment of the invention, an algorithm for overlapping and hierarchical community detection can also include consideration of secondary and/or hierarchical communities. Such communities can include nodes which are not the primary community for any node. Additionally, the second most important community for any node can be used in forming a secondary community, and a secondary community can be nested inside a primary community. Further, secondary communities can be detected in a similar fashion to primary communities, as detailed herein.

Overlapping and hierarchical community detection can be implemented, by way of example, as follows. While iterative matrix multiplication over multiple matrices is not practical because all participant matrices are sparse in practice, the number of communities is typically much less than number of nodes, and $W_n$ allows smaller non-feasible communities to proliferate, at least one embodiment of the invention includes solutions to these challenges.

For example, an example embodiment of the invention includes allowing a limited amount of participation per node. Accordingly, P has the dimension (n, p), wherein n is the number of nodes and p is the length of the participation vector. Reducing the dimensions of P reduces the effect of $W_n$ on smaller communities, while larger communities remain largely unaffected. Additionally, iterative community detection is feasible with lower complexity: $O(n_d \log(d))$ work per iteration, wherein d=the average degree of the nodes in the graph. The number of iterations=propagation time+stabilization time, wherein propagation time is of the complexity order O(D), and wherein D=the diameter of the graph.

As detailed herein, at least one embodiment of the invention includes community detection on signed networks. Signed network community detection can be modeled into a label propagation framework, and can include steps of network initialization and propagation. Network initialization includes each edge attempting to identify its possible edge sign based on the recommendation of its neighborhood. Given an edge, each loop containing the edge (typically 3-4 hops) recommends an edge sign. The average of the recommended edge signs is taken as the edge sign. Propagation includes each community attempting to maximize internal balance as well as excluding non-consistent edges to the community boundaries. In each iteration, the anomalous edges have edge signs different from those recommended by the neighborhood.

As additionally noted herein, at least one embodiment of the invention includes community detection on directed graphs. Directed Graphs need not present a mutually agreeable consistency, with each directed edge reciprocated by a reverse edge of equivalent weight. Directed edges can be reweighed and on equilibrium, each edge is to be presented a weight based on mutual acceptance. In directed graphs, each edge represents a unidirectional relation. Further, to be topologically consistent, once equilibrium is attained, reversing the direction of the edge should not decrease the distance between edges substantially.

Accordingly, in at least one embodiment of the invention, edges of the graph, which do not show topological consistence, are removed. Accordingly, if an edge previously considered inconsistent can be considered as topologically consistent, that edge is added back. By way merely of example, removed edges can show characteristics that can be equated to an edge formed by a marketing call center calling a customer in a telecom graph.

At least one embodiment of the invention can additionally include an online algorithm. In such an algorithm, each state of the graph can present a certain orientation of the communities, and addition of edges can lead to a merger of communities so formed. Accordingly, a framework such as described herein can directly integrate community data in an online method. After each step of edge addition and/or deletion, an online algorithm stabilizes to a stable state, and each such stable state can indicate a natural increment over the previous state.

Figure 1:
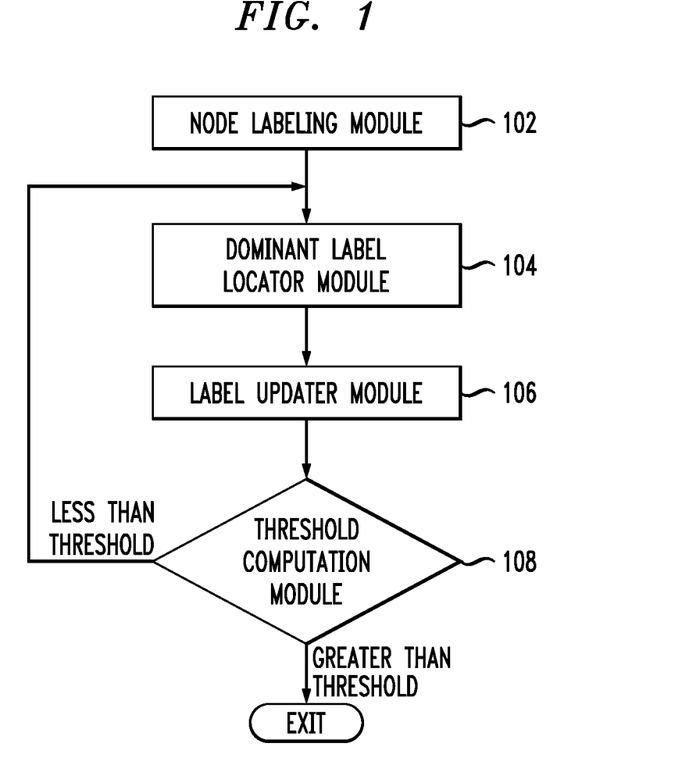
FIG. 1 is a block diagram illustrating an example embodiment, according to an aspect of the invention.

FIG. 1 is a block diagram illustrating an example embodiment, according to an aspect of the invention. By way of illustration, FIG. 1 depicts a node labeling module 102, a dominant label locator module 104, a label updater module 106 and a threshold computation module 108. In connection with the techniques detailed herein, node labeling module 102 sets all nodes in a graph with a unique label. For each node, dominant label locator module 104 identifies the dominant label in an immediate neighborhood of the graph. Further, label updater module 106 correspondingly updates the label on the node. Additionally, threshold computation module 108 determines if the number of labels switched (in the previous steps) is less than a pre-determined threshold. If the number of labels switched is less than the threshold, the techniques return to the step of identifying the dominant label in an immediate neighborhood of the graph via module 104. If the number of labels switched is greater than the threshold, the current iteration of the techniques is completed.

Figure 2:
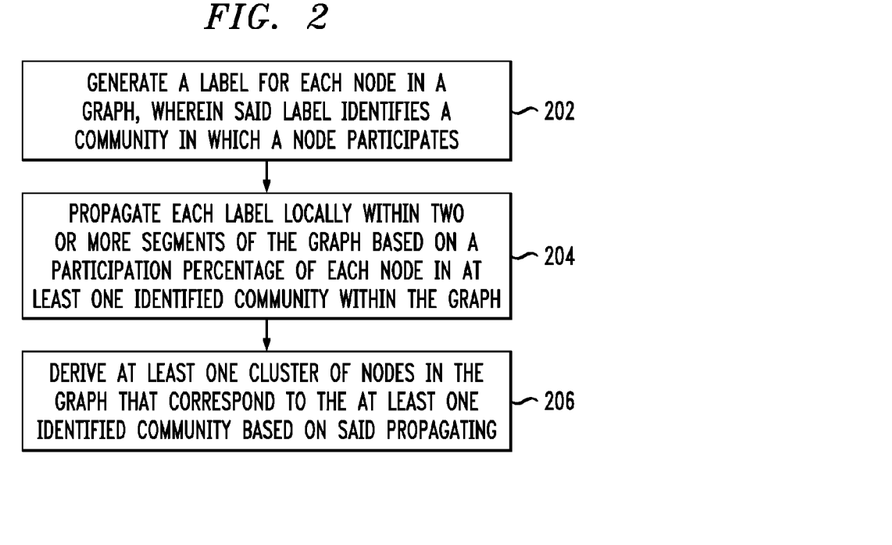
FIG. 2 is a flow diagram illustrating techniques for deriving a cluster of nodes in a graph that correspond to an identified community, according to an embodiment of the invention.

FIG. 2 is a flow diagram illustrating techniques for deriving a cluster of nodes in a graph that correspond to an identified community, according to an embodiment of the present invention. Step 202 includes generating a label for each node in a graph, wherein said label identifies a community in which a node participates. The graph can be one of a signed graph, an unsigned graph, a weighted graph, an un-weighted graph, a directed graph, an undirected graph, and a combination thereof.

Step 204 includes propagating each label locally within two or more segments of the graph based on a participation percentage of each node in at least one identified community within the graph (percentile participation of a node to a given community). Step 206 includes deriving at least one cluster of nodes in the graph that corresponds to the at least one identified community based on said propagating.

The techniques depicted in FIG. 2 can additionally include processing the graph to remove one or more topological anomalies from the graph. Further, at least one embodiment of the invention includes performing multiple iterations of the propagating step, wherein the number of iterations running in parallel is based on the diameter of the graph, and propagating each label locally within two or more segments of the graph in parallel. Additionally, such an embodiment can include obtaining a current value from at least one neighboring node to generate data for a node for the next iteration.

Also, the techniques depicted in FIG. 2 can include integrating community data, as well as incorporating an incremental update for an addition or deletion of a node and/or an edge.

Figure 3:
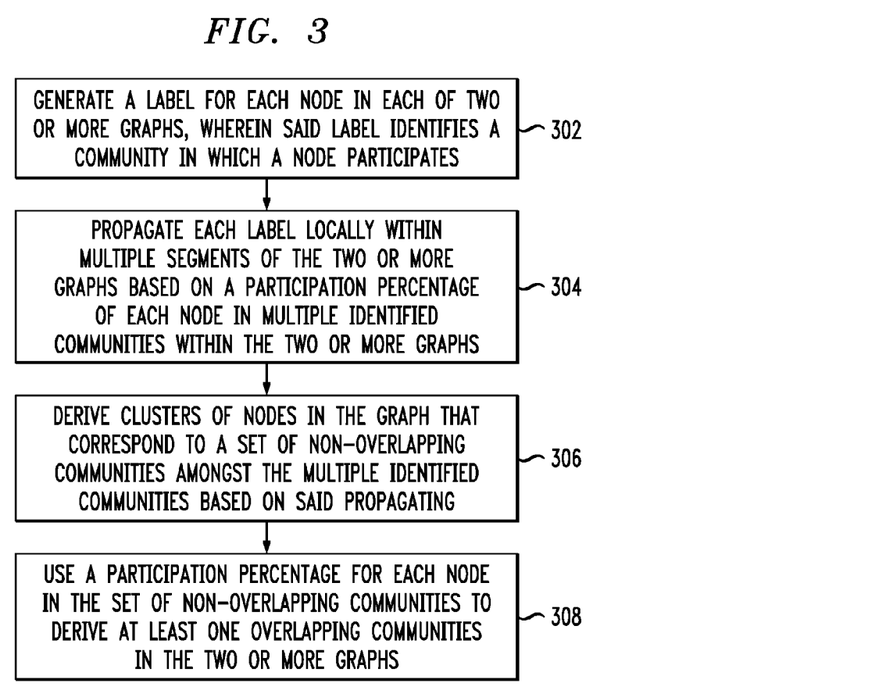
FIG. 3 is a flow diagram illustrating techniques for using label propagation to derive overlapped communities in multiple graphs, according to an embodiment of the invention.

FIG. 3 is a flow diagram illustrating techniques for using label propagation to derive overlapped communities in multiple graphs, according to an embodiment of the invention. Step 302 includes generating a label for each node in each of two or more graphs, wherein said label identifies a community in which a node participates. Step 304 includes propagating each label locally within multiple segments of the two or more graphs based on a participation percentage of each node in multiple identified communities within the two or more graphs (percentile participation of a node to a given community). Step 306 includes deriving clusters of nodes in the graph that correspond to a set of non-overlapping communities amongst the multiple identified communities based on said propagating. Step 308 includes using a participation percentage for each node in the set of non-overlapping communities to derive at least one overlapping community in the two or more graphs.

The techniques depicted in FIG. 2 and FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 and FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
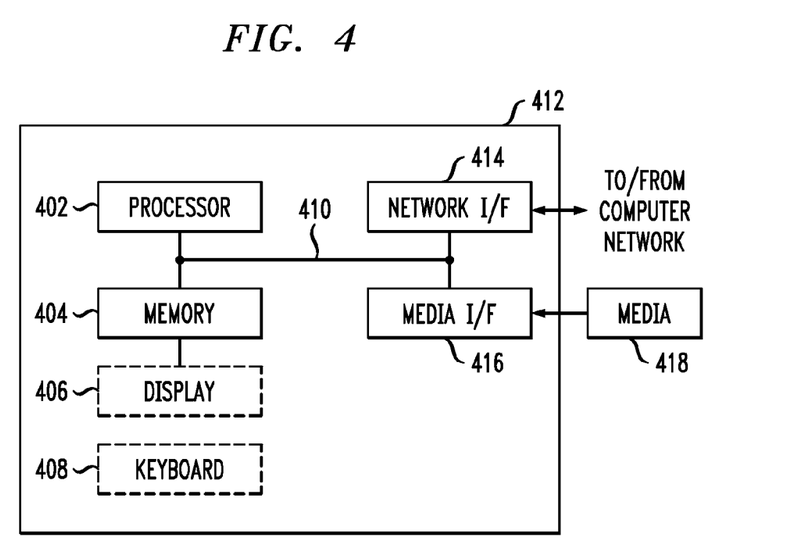
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, to component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, providing community detection that is scalable to large networks and extendible to multiple architectures.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for deriving a cluster of nodes in a graph that correspond to an identified community, the method comprising:

determining, for each node in a graph, a participation percentage in each of multiple communities;

generating a label for a given node in the graph, wherein said label identifies a primary community among the multiple communities in which the given node participates, wherein the primary community is the community for which the given node has the maximum participation percentage;

propagating the label locally within two or more segments of the graph based on the participation percentage of each node in the multiple communities within the graph, wherein said propagating comprises propagating the label to one or more additional nodes of the graph that have a maximum participation percentage in the primary community identified via the label; and deriving at least one cluster of nodes in the graph that corresponds to the identified primary community based on said propagating;

wherein at least one of the steps is carried out by a computer device.

2. The method of claim 1, comprising processing the graph to remove one or more topological anomalies from the graph.

3. The method of claim 1, comprising performing multiple iterations of said propagating step.

4. The method of claim 3, comprising propagating each label locally within two or more segments of the graph in parallel.

5. The method of claim 3, comprising obtaining a current value from at least one neighboring node to generate data for a node for the next iteration.

6. The method of claim 3, wherein the number of iterations running in parallel is based on the diameter of the graph.

7. The method of claim 1, wherein the graph is one of a signed graph, an unsigned graph, a weighted graph, an unweighted graph, a directed graph, an undirected graph, and a combination thereof.

8. The method of claim 1, wherein said deriving comprises deriving at least one cluster of nodes in the graph that corresponds to the at least one identified community based on said propagating and on community data.

9. The method of claim 1, comprising performing an incremental update for an addition of a node and/or an edge.

10. The method of claim 1, comprising performing an incremental update for a deletion of a node and/or an edge.

11. An article of manufacture comprising a computer readable storage medium having computer readable instructions tangibly embodied thereon which, when implemented, cause a computer to carry out a plurality of method steps comprising:

determining, for each node in a graph, a participation percentage in each of multiple communities;

generating a label for a given node in the graph, wherein said label identifies a primary community among the multiple communities in which the given node participates, wherein the primary community is the community for which the given node has the maximum participation percentage;

propagating the label locally within two or more segments of the graph based on the participation percentage of each node in the multiple communities within the graph, wherein said propagating comprises propagating the label to one or more additional nodes of the graph that have a maximum participation percentage in the primary community identified via the label; and     deriving at least one cluster of nodes in the graph that corresponds to the identified primary community based on said propagating.

12. The article of manufacture of claim 11, wherein the method steps comprise performing multiple iterations of said propagating step.

13. The article of manufacture of claim 12, wherein the method steps comprise propagating each label locally within two or more segments of the graph in parallel.

14. The article of manufacture of claim 12, wherein the method steps comprise obtaining a current value from at least one neighboring node to generate data for a node for the next iteration.

15. The article of manufacture of claim 12, wherein the number of iterations running in parallel is based on the diameter of the graph.

16. The article of manufacture of claim 11, wherein the graph is one of a signed graph, an unsigned graph, a weighted graph, an un-weighted graph, a directed graph, an undirected graph, and a combination thereof.

17. The article of manufacture of claim 11, wherein the method steps comprise incorporating an incremental update for an addition of a node and/or an edge.

18. The article of manufacture of claim 11, wherein the method steps comprise incorporating an incremental update for a deletion of a node and/or an edge.

19. A system for deriving a cluster of nodes in a graph that correspond to an identified community, comprising:

at least one distinct software module, each distinct software module being embodied on a tangible computer-readable medium;

a memory; and at least one processor coupled to the memory and operative for:

determining, for each node in a graph, a participation percentage in each of multiple communities;

generating a label for a given node in the graph, wherein said label identifies a primary community among the multiple communities in which the given node participates, wherein the primary community is the community for which the given node has the maximum participation percentage;

propagating the label locally within two or more segments of the graph based on the participation percentage of each node in the multiple communities within the graph, wherein said propagating comprises propagating the label to one or more additional nodes of the graph that have a maximum participation percentage in the primary community identified via the label; and         deriving at least one cluster of nodes in the graph that corresponds to the identified primary community based on said propagating.

20. A method for using label propagation to derive overlapped communities in multiple graphs, the method comprising:

determining, for each node in each of two or more graphs, a participation percentage in each of multiple identified communities;

generating a label for a given node in the two or more graphs, wherein said label identifies a primary community among the multiple communities in which the given node participates, wherein the primary community is the community for which the given node has the maximum participation percentage;

propagating the label locally within multiple segments of the two or more graphs based on the participation percentage of each node in the multiple identified communities within the two or more graphs, wherein said propagating comprises propagating the label to one or more additional nodes that have a maximum participation percentage in the primary community identified via the label;

deriving at least one non-overlapping cluster of nodes in the two or more graphs that correspond to the identified primary community based on said propagating; and     using a participation percentage for each node in the non-overlapping cluster to derive at least one overlapping community in the two or more graphs;

wherein at least one of the steps is carried out by a computer device.

\* \* \* \* \*